(12) United States Patent
Gaither (10) Patent No.: US 9,891,060 B2
(45) Date of Patent: Feb. 13, 2018

(54) OCCUPANCY BASED NAVIGATION SYSTEM

(71) Applicant: Toyota Motor Engineering & Manufacturing North America, Inc., Erlanger, KY (US)

(72) Inventor: Geoffrey D. Gaither, Torrance, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/084,370

(22) Filed: Mar. 29, 2016

(65) Prior Publication Data

US 2017/0284814 A1   Oct. 5, 2017

(51) Int. Cl.
*G01C 21/34* (2006.01)
*G01C 21/20* (2006.01)
*G01C 21/36* (2006.01)

(52) U.S. Cl.
CPC ......... *G01C 21/3415* (2013.01); *G01C 21/20* (2013.01); *G01C 21/3469* (2013.01); *G01C 21/3492* (2013.01); *G01C 21/3667* (2013.01)

(58) Field of Classification Search
CPC ....... G08G 1/096844; G08G 1/096811; G08G 1/096827; G01C 21/3415; G01C 21/3492; G01C 21/20; G01C 21/3469; G01C 21/3667
USPC ........................................................ 701/414
See application file for complete search history.

(56) References Cited

U.S. PATENT DOCUMENTS

| 7,375,648 | B1 | 5/2008 | Mulka et al. |
| 8,055,534 | B2 | 11/2011 | Ashby et al. |
| 8,583,367 | B2 | 11/2013 | Mineta et al. |
| 8,666,662 | B2 | 3/2014 | Irie et al. |
| 8,798,929 | B2 | 8/2014 | Tsuji et al. |
| 8,825,372 | B2 | 9/2014 | Nishibashi et al. |
| 8,825,380 | B2 | 9/2014 | Machino |
| 2010/0049397 | A1 | 2/2010 | Liu et al. |
| 2010/0169007 | A1 | 7/2010 | Kaushik et al. |
| 2010/0201505 | A1 | 8/2010 | Honary et al. |
| 2010/0292916 | A1* | 11/2010 | Kurciska ............ G01C 21/3453 701/533 |

(Continued)

FOREIGN PATENT DOCUMENTS

EP            2551639         1/2013

*Primary Examiner* — Maceeh Anwari
(74) *Attorney, Agent, or Firm* — Snell & Wilmer LLP (57) ABSTRACT

A system for navigating a vehicle using a High Occupancy Vehicle (HOV) lane. The system includes a vehicle occupancy unit configured to determine vehicle occupancy data. The system also includes a memory configured to store map data and HOV lane data indicating HOV lane criteria. The system also includes a processor connected to the vehicle occupancy unit, the transceiver, and the memory. The processor is configured to determine an HOV lane section. The processor is also configured to determine whether the HOV lane section is accessible to the vehicle based on the vehicle occupancy data and the HOV lane data. The processor is also configured to determine an HOV lane route between the current location and a destination when the HOV lane section is accessible to the vehicle. The system also includes a display connected to the processor, the display configured to display the HOV lane route.

20 Claims, 9 Drawing Sheets

(56) References Cited

U.S. PATENT DOCUMENTS

| | | |
|---|---|---|
| 2012/0179361 A1* | 7/2012 | Mineta .............. G01C 21/3676 701/410 |
| 2012/0215594 A1 | 8/2012 | Gravelle |
| 2013/0013203 A1 | 1/2013 | Sumizawa et al. |
| 2014/0032098 A1 | 1/2014 | Anderson |

* cited by examiner

OCCUPANCY BASED NAVIGATION SYSTEM

BACKGROUND

1. Field

The present disclosure relates to a system and a method for providing navigation instructions, and more particularly to a system and a method for providing navigation instructions based on the occupancy of a vehicle.

2. Description of the Related Art

Navigation systems are capable of providing navigation instructions to a user based on a current location and a desired destination. Typically, navigation systems are used in vehicles for providing driving directions. These navigation systems utilize Global Positioning System (GPS) technology for estimating the current location of the vehicle and generating a series of instructions to guide the user to the destination. In typical usage, the driver or another occupant inside the vehicle inputs the destination name or address via an interface (e.g., an LCD screen) on the navigation system. Once the address is received, the navigation system maps a route and provides instructions verbally or displays the instructions on a map or a screen, or both. As the driver begins driving the vehicle, the navigation system may provide turn-by-turn directions, verbally instructing the driver which road to stay on, which exit to take, and where to make a turn, thereby assisting the driver in reaching the desired destination.

However, navigation systems are not optimal, as they do not take High Occupancy Vehicle (HOV) lanes into account when determining routes to provide the user. HOV lanes may be used by vehicles meeting particular occupancy criteria. Some HOV lanes allow access for vehicles with two or more total occupants and some HOV lanes allow access for vehicles with three or more total occupants. In many instances, travelling in an HOV lane is faster than travelling in a non-HOV lane, particularly during peak weekday commuting times. As a result, navigation systems not taking HOV lanes into account may not provide users the fastest possible way to get to a destination.

Thus, there is a need for systems and methods for providing navigation instructions based on current vehicle occupancy.

SUMMARY

What is described is a system for navigating a vehicle using a High Occupancy Vehicle (HOV) lane. The system includes a vehicle occupancy unit configured to determine vehicle occupancy data. The system also includes a transceiver configured to determine a current location of the vehicle. The system also includes a memory configured to store map data and HOV lane data indicating HOV lane criteria. The system also includes a processor connected to the vehicle occupancy unit, the transceiver, and the memory. The processor is configured to determine an HOV lane section within a range of the current location of the vehicle based on the map data. The processor is also configured to determine whether the HOV lane section is accessible to the vehicle based on the vehicle occupancy data and the HOV lane data. The processor is also configured to determine an HOV lane route between the current location and a destination, the HOV lane route including the HOV lane section, when the HOV lane section is accessible to the vehicle. The system also includes a display connected to the processor, the display configured to display the HOV lane route.

Also described is a vehicle including a memory configured to store map data including a plurality of HOV lane sections and a plurality of non-HOV lane sections. The vehicle also includes a transceiver configured to determine a current location of the vehicle and receive traffic data associated with each of the HOV lane sections and the non-HOV lane sections. The vehicle also includes a user interface configured to receive an indication that the vehicle has access to the HOV lanes. The vehicle also includes a processor connected to the transceiver, the user interface, and the memory. The processor is configured to determine an HOV lane section within a range of the current location of the vehicle based on the map data. The processor is also configured to determine a plurality of potential routes between the current location and a destination, each of the plurality of potential routes including the HOV lane section. The processor is also configured to determine a fastest HOV lane route from the plurality of potential routes based on the traffic data. The vehicle also includes a display connected to the processor, the display configured to display the fastest HOV lane route.

Also described is a method for navigating a vehicle using a High Occupancy Vehicle (HOV) lane. The method includes determining, by a vehicle occupancy unit, vehicle occupancy data. The method also includes determining, by a transceiver, a current location of the vehicle. The method also includes storing, by a memory, map data and HOV lane data indicating HOV lane criteria. The method also includes determining, by a processor, an HOV lane section within a range of the current location of the vehicle based on the map data. The method also includes determining, by the processor, whether the HOV lane section is accessible to the vehicle based on the vehicle occupancy data and the HOV lane data. The method also includes determining, by the processor, an HOV lane route between the current location and a destination, the HOV lane route including the HOV lane section, when the HOV lane section is accessible to the vehicle. The method also includes displaying, by a display, the HOV lane route.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems and methods for providing occupancy based navigation instructions. The systems and methods provide several benefits and advantages such as providing better navigation instructions to individuals, particularly those who have multiple passengers in a vehicle, allowing for access to HOV lanes. Determining navigation instructions based on vehicle occupancy provides benefits and advantages such as the ability to include HOV lanes in potential routes for the user to take. This is advantageous because many times vehicles in an HOV lane move at a faster speed than those in non-HOV lanes. For example, if a driver with a passenger is travelling from Long Beach, Calif. to Pasadena, Calif., a navigation system that does not take HOV lane access into account may recommend taking the 110 North. However, a navigation system taking HOV lane access into consideration may recommend taking the 405 North with the HOV lane, since there is at least one passenger, as it would be a more time or fuel efficient route. Determining navigation instructions based on vehicle occupancy provides additional benefits and advantages such as easing congestion on roads by allowing drivers to take the most efficient route possible.

Determining navigation instructions based on vehicle occupancy also provides a benefit to those who may blindly assume taking a route with an HOV lane is more time efficient. For example, if a driver with a passenger is travelling from Torrance, Calif. to Costa Mesa, Calif. and used a navigation system that did not take HOV lane access into account, the navigation system may provide an option of taking the 405 South the entire way or a combination of the 405 South, the 22 East, and surface streets, with the recommendation of the latter, as there is an accident on the 405 South. However, the driver may believe that despite the suggestion of the navigation system, taking the 405 South the entire way may be faster, as the driver can use the HOV lane. In reality, the HOV lane may be just as congested, and the driver would have been better off taking the recommendation of the non-HOV navigation system—the combination of the 405 South, the 22 East, and surface streets. A navigation system taking HOV lane access into consideration may still recommend the same route as the navigation system not taking HOV lane access into consideration, but the user is more apt to follow the recommendation of the navigation system with HOV lane access consideration and has more confidence in its recommendation.

An exemplary system includes a vehicle occupancy unit configured to determine vehicle occupancy data. The system also includes a transceiver configured to determine a current location of the vehicle. The system also includes a memory configured to store map data and HOV lane data indicating HOV lane criteria. The system also includes a processor connected to the vehicle occupancy unit, the transceiver, and the memory. The processor is configured to determine an HOV lane section within a range of the current location of the vehicle based on the map data. The processor is also configured to determine whether the HOV lane section is accessible to the vehicle based on the vehicle occupancy data and the HOV lane data. The processor is also configured to determine an HOV lane route between the current location and a destination, the HOV lane route including the HOV lane section, when the HOV lane section is accessible to the vehicle. The system also includes a display connected to the processor, the display configured to display the HOV lane route.

Figure 1A:
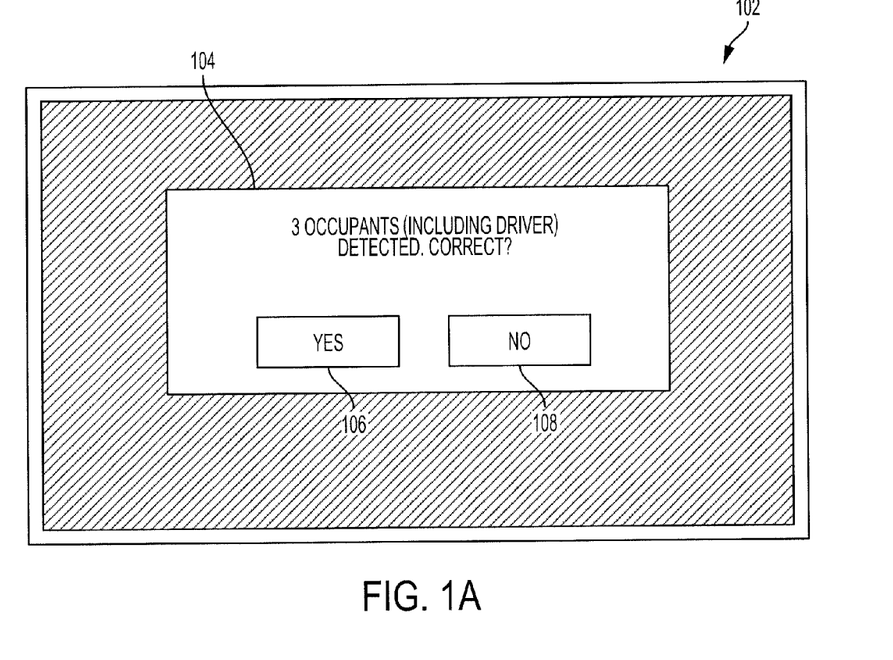
FIG. 1A illustrates an example of a screenshot of a display with a confirmation of the number of total occupants in a vehicle, according to an embodiment of the invention.

FIG. 1A illustrates an example of a screenshot of a navigation system display 102 with a confirmation screen 104 indicating a number of detected occupants in the vehicle. The navigation system display 102 receives vehicle occupancy data from a processor, which receives the vehicle occupancy data from a vehicle occupancy unit. In some embodiments, the vehicle occupancy unit detects an occupant in a seat using a weight sensor. In some embodiments, the vehicle occupancy unit detects an occupant in a seat using a seat belt engagement sensor. For example, the vehicle occupancy unit may detect the number of seat belts fastened or connected to determine how many occupants are in the vehicle. In some embodiments, the vehicle occupancy unit detects a number of occupants using a suspension sensor by comparing current suspension data with suspension data when the vehicle is empty. While a suspension based determination of vehicle occupancy may not be as precise as individual seat belt based or weight based sensors, in many cases, the suspension based determination is sufficiently accurate, as the determination to be made is typically whether there are more than one occupant in the vehicle. In other words, in many cases, it may not matter whether there are four occupants or five for purposes of HOV lane usage, as long as the system can reliably determine there is more than one occupant.

The vehicle occupancy unit may detect an occupant in a seat using a thermal sensor configured to detect thermal data. In some embodiments, the thermal sensor is located in a seat, to detect a rise in temperature corresponding with an occupant sitting in the seat. In some embodiments, the thermal sensor is located in the vicinity of the seat, to detect a rise in temperature corresponding with an occupant being in the seat and causing a rise in temperature in the vicinity of the seat. In some embodiments, the thermal sensor located in the vicinity of the seat may be responsible for detecting thermal data for more than one seat. In some embodiments, a decrease in temperature detected by the vehicle occupancy unit using thermal detection may be a trigger to update the number of occupants in the vehicle.

The vehicle occupancy unit may also detect an occupant in a seat using imaging data detected by an imaging sensor. The imaging sensor may be located in the vicinity of a seat and configured to detect imaging data corresponding to the seat. In some embodiments, the imaging sensor is responsible for detecting imaging data for more than one seat. In some embodiments, the imaging sensor is a camera and the imaging data detected by the camera is communicated to a processor for image processing, to determine the presence of an occupant. In some embodiments, the imaging sensor is an infrared camera and the imaging data detected by the infrared camera is thermal imaging data communicated to the processor for image processing, to determine the presence of an occupant.

Any of the sensors described herein for detecting an occupant (e.g., seat weight sensor, seat belt engagement sensor, suspension sensor, thermal sensor, or imaging sensor) may be used individually or in combination with one or more other sensors to detect the presence of an occupant in a particular seat. For example, a seat weight sensor and a thermal sensor located in the seat may be used together to determine the presence of an occupant in the seat. The one or more sensors may be used to detect the presence of occupants in multiple seats. For example, a suspension sensor, a thermal sensor located in the vicinity of multiple seats, and an imaging sensor facing the multiple seats may be used together to determine whether there are one or more occupants in the multiple seats.

In some embodiments, the confirmation screen 104 presents the number of total occupants in the vehicle including the driver. The confirmation screen 104 may assume a driver is in the vehicle and present or display the number of passengers in the vehicle. In some embodiments, when the vehicle is a fully autonomous vehicle, the number of total occupants is presented with no mention of inclusion or exclusion of a driver, as the vehicle is autonomously operated.

The display 102 provides a "YES" 106 and "NO" 108 icon within the confirmation screen 104 to allow a user to confirm or deny the number of detected occupants. The icons may be presented on a touch screen or pad so that the user may press on the icon to indicate selection of the icon. Alternatively, the icons may be presented on a non-touch display and physical buttons corresponding to the icons may be available to be pressed by the user.

If the user denies the detected number of occupants, by pressing "NO" 108, for example, an interface is presented for the user to manually enter in the number of occupants in the vehicle. In some embodiments, when the vehicle occupancy is determined based on the engagement of the seat belts, the confirmation screen 104 may act as a safety mechanism to bring to the user's attention possible unbuckled seat belts.

The confirmation screen 104 may not be displayed at all and the user may manually enter the number of occupants when entering a destination. In some embodiments, the user enters the number of occupants using one or more buttons or icons associated with the navigation system. In some embodiments, the user enters the number of occupants using a voice command. In some embodiments, the user may choose whether occupancy is manually or automatically determined.

Once the user has confirmed or manually input the number of total occupants in the vehicle, the display 102 provides an interface for the user to input a destination. The user may input the destination using a keypad provided by a touch screen, a physical keyboard with keys connected to the system, or using voice instructions. In some embodiments, the destination is provided automatically based on a destination prediction. The occupancy based navigation system determines multiple routes based on the current traffic and HOV lanes available to the vehicle based on the number of occupants in the vehicle. Some freeways allow vehicles with two or more occupants to use the HOV lane. Other freeways allow vehicles with three or more occupants to use the HOV lane. Some freeways allow vehicles to enter or exit the HOV lane at any time, while others only allow entering and exiting the HOV lane at certain designated portions of the freeway. Yet other freeways have HOV lanes available on certain days of the week and/or certain times of the day. All of this information is considered by the system, as described herein.

In some situations, an HOV lane may be used by a vehicle not having the requisite number of occupants in the vehicle. For example, in certain jurisdictions, motorcycles with even one rider may use the HOV lane. In another example, in certain jurisdictions, fuel cell, fully electric or partially electric (e.g., hybrid) vehicles may use an HOV lane even if the number of occupants in the vehicle does not meet the required number of occupants. These qualifying vehicles may have an indicator, such as a sticker, on the exterior of the vehicle indicating that it is allowed to use the HOV lane.

Figure 1B:
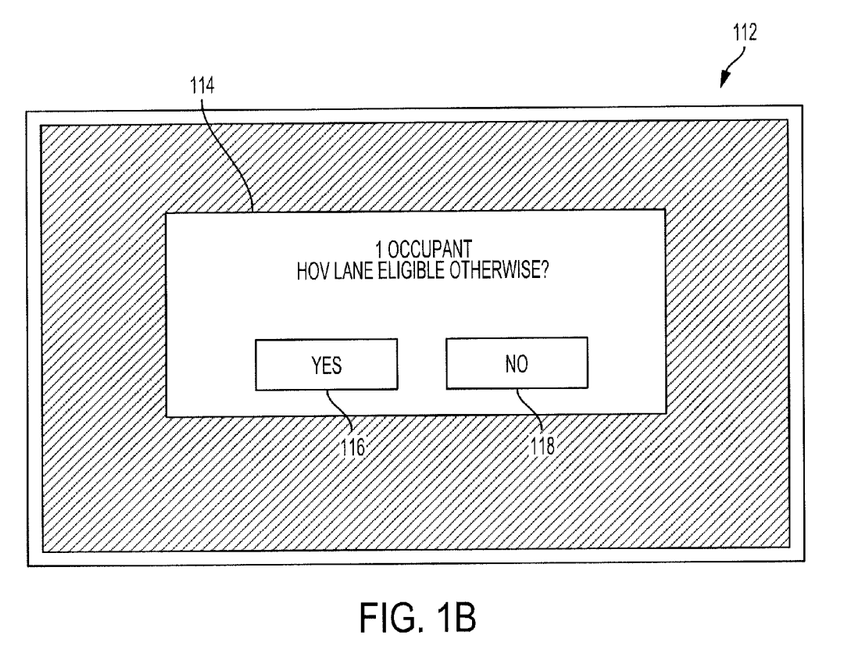
FIG. 1B illustrates an example of a screenshot of a display with a prompt regarding alternate HOV lane access, according to an embodiment of the invention.

FIG. 1B illustrates an example of a screenshot of a navigation unit display 102 with a screen 114 prompting the user to indicate whether the vehicle has access to use HOV lanes by some other qualification or eligibility, such as by use of an emissions sticker. "YES" 116 and "NO" 118 icons are provided within the screen 114. If the vehicle is otherwise eligible to use the HOV lanes despite not having more than two or three total occupants, the icon for "YES" 116 is selected; otherwise, the icon for "NO" 118 is selected by the user. In some embodiments, the user is able to save the qualification or eligibility in a memory associated with the system, such that the user does not have to indicate whether the vehicle has access to use the HOV lanes each time. In some embodiments, the saved qualification or eligibility may be changed by the user, in case circumstances change. For example, the vehicle may qualify based on an emissions sticker, but the sticker may have an expiration date. During the time the sticker is valid, the user may store an eligibility status of the vehicle as being able to use the HOV lanes regardless of occupants, but when the sticker expires, the user may modify the eligibility status of the vehicle as no longer being able to use the HOV lanes without the appropriate number of occupants.

Figure 2:
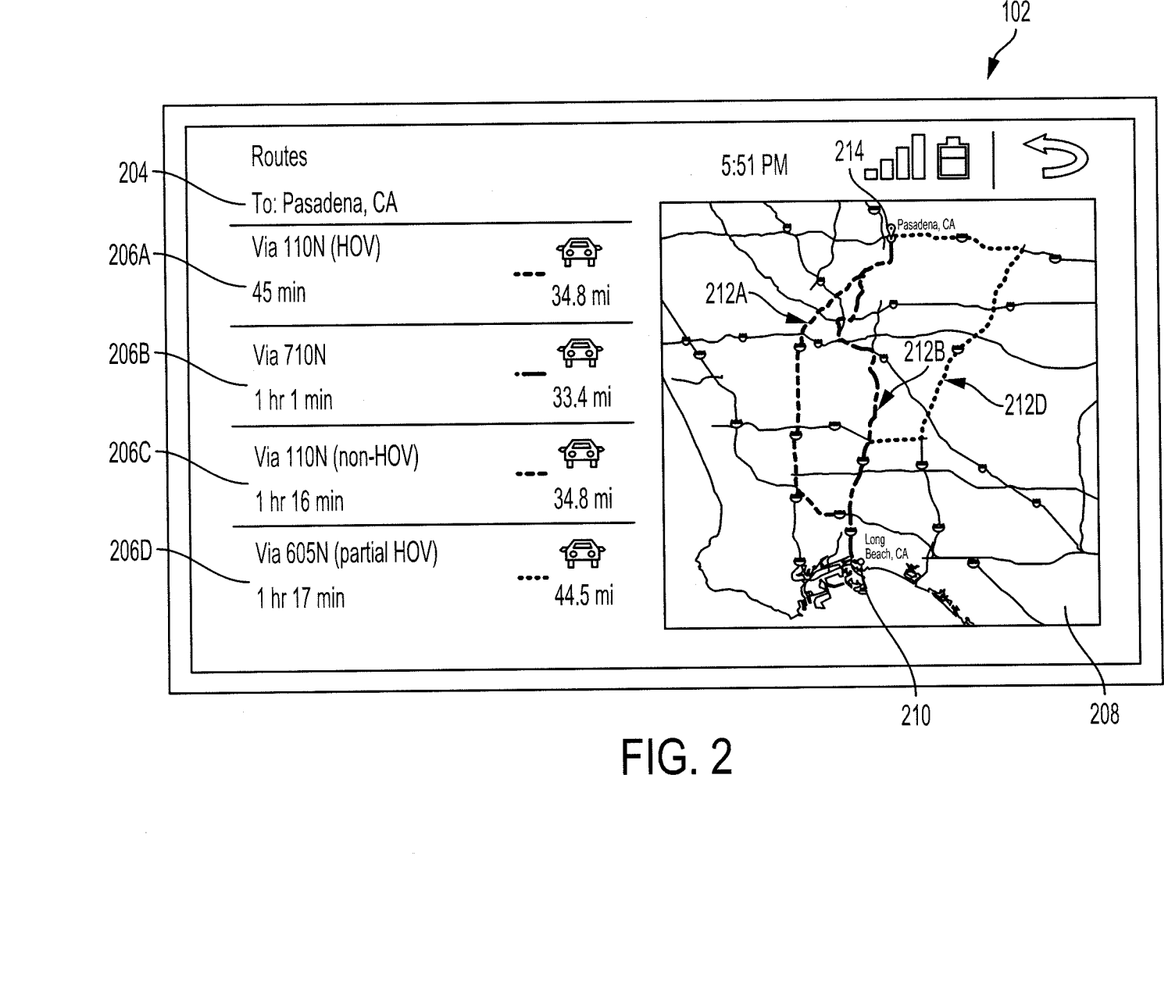
FIG. 2 illustrates an example of a screenshot of a navigation display with a display of multiple navigation routes including routes with HOV lanes, according to an embodiment of the invention.

FIG. 2 illustrates an example of a screenshot of a navigation unit display 102 presenting the fastest route or routes available to the vehicle. The display 102 provides multiple routes 206A-206D and a map 208. Also displayed in text is the destination 204.

The multiple routes 206A-206D are each characterized with a general description of the route as well as an indication of whether HOV lanes are used and to what extent the HOV lanes are used. In some embodiments, the general description of the route includes one or more roads or paths traveled the most (either in terms of distance or time). In addition, text accompanying the general description of a route indicating use of an HOV lane may use the phrase "with HOV lane" or "HOV," for example.

In FIG. 2, the vehicle is currently in Long Beach, Calif. and the destination is Pasadena, Calif. Multiple routes are presented: a first route 206A taking primarily the 110 North using an HOV lane, a second route 206B taking primarily the 710 North without an HOV lane, a third route 206C taking primarily the 110 North but not in the HOV lane, and a fourth route 206D taking primarily the 605 North with a portion of the route using an HOV lane. Also, presented are a time estimate and a number of miles traveled corresponding to each route.

In some embodiments, a distinction is made in the display between a route that has no HOV lane available and a route that has an HOV lane available, but the HOV lane is not being used in the route. In some cases, use of an HOV lane may result in a later arrival time at the destination. This may be true if there is an accident or other road blockage in the HOV lane.

The map 208 displays the location 210 of the vehicle, the destination 214 (which corresponds to the destination 204 displayed in text) and multiple map routes 212A-212D in varying colors or patterns corresponding to the generated routes 206A-206D. In some embodiments, the same route may be displayed twice, once with HOV lane usage and once without HOV lane usage. In these cases, the same color or pattern may be used for both routes and the difference may be presented in the textual route description.

By glancing at the navigation display 102, the user may easily ascertain the fastest route possible and whether the fastest route includes use of an HOV lane. The user may also ascertain whether use of one or more HOV lanes will be beneficial. In FIG. 2, the user may realize that use of the 110 North is the fastest route but only if the HOV lane is being utilized. If the HOV lane is not being used on the 110 North, the 710 North is the faster route.

The display may show all HOV lanes in the vehicle's vicinity on the display, on a map. The display may show traffic data layered over or under the HOV lane graphics. The display may provide HOV lane accessibility data in a separate manner, such as via a speaker. For example, the system may provide a map of the routes available and may identify, using a speaker, the routes which allow for HOV lane usage by the vehicle.

Figure 3:
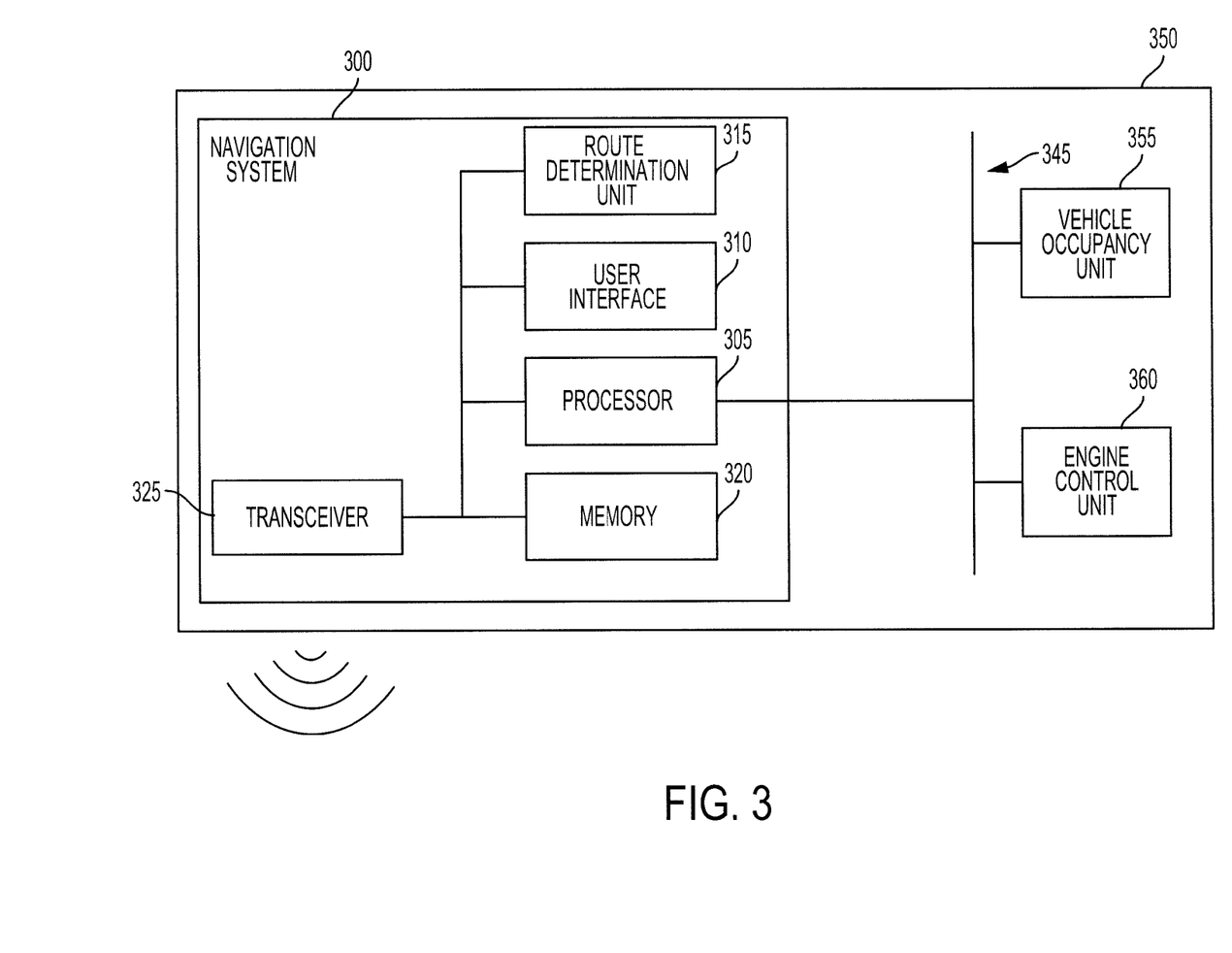
FIG. 3 depicts a block diagram of a navigation system in communication with a vehicle, according to an embodiment of the invention.

FIG. 3 illustrates a block diagram of an integrated navigation system. As depicted, the navigation unit 300 may be connected to a control system of the vehicle 350. In an example embodiment, the control system of the vehicle 350 includes a Controller Area Network (CAN) bus 345. The CAN bus 345 is a vehicle bus standard designed to allow microcontrollers and devices to communicate with each other within a vehicle 350. More particularly, the CAN bus 345 is a multi-master broadcast serial bus standard for connecting electronic control units (ECUs). ECUs may be used for controlling the vehicle's turn signals, transmission, airbags, antilock brakes, cruise control, audio systems, windows, doors, mirror adjustment, etc. One or more ECUs may also provide information such as the number of detected occupants in the vehicle 350.

In this embodiment, the navigation system 300 may be an integrated, OEM navigation system installed at the front central console area of the vehicle between the driver and the front passenger seat. However, the actual location of the navigation system 300 may be anywhere inside the vehicle. For example, the navigation system 300 may be integrated into the instrument display panel behind the steering wheel or attached to the ceiling area of the vehicle and configured to be stowed when not in use. The navigation system 300 may include a processor 305, a user interface 310, a route-determination unit 315, a memory 320 and a transceiver 325. In some embodiments, the navigation system 300 may be considered one such ECU connected to the CAN bus 345, and may communicate with other ECUs via the CAN bus 345.

In some embodiments, the user interface 310 is an LCD touch screen input that the user may press to input commands and destination addresses into the navigation system 300. In one embodiment of the operation of the navigation system 300, the processor 305 receives a destination address from the user interface 310 and receives a current location from the transceiver 325 communicating with, for example, a GPS satellite to determine the exact location of the vehicle. Next, the processor 305 obtains map data and HOV lane data from the memory 320 and identifies one or more HOV lane sections accessible to the vehicle 350. The processor 305 provides the current location, the destination, the identified HOV lane sections to use, and the map data to the route calculation unit 315 for determination of one or more routes incorporating at least one of the identified HOV lane sections. In some embodiments, traffic data is received via a traffic information server, using the transceiver 325, and the traffic data is provided to the route determination unit 315 for determining the routes. Once the routes are calculated, the processor 305 provides the route information to the user interface 310 for display and/or verbal output to the user. As the vehicle moves, the navigation system 300 may track the route and the exact location of the vehicle in order to provide real-time turn-by-turn directions.

As shown in FIG. 3, the processor 305 may be coupled to the CAN bus 345 to communicate with any number of other ECUs, such as a vehicle occupancy unit 355 or an engine control unit 360. In some embodiments, the processor 305 obtains vehicle occupancy data from the vehicle occupancy unit 355, such as the number of detected occupants of the vehicle 350. The vehicle occupancy data may be communicated to the navigation system 300 via the CAN bus 345. Once received by the navigation system 300, the processor 305 may perform calculations (if needed) or may utilize the vehicle occupancy data to determine routes available to the vehicle 350 based on the number of occupants.

Figure 4:
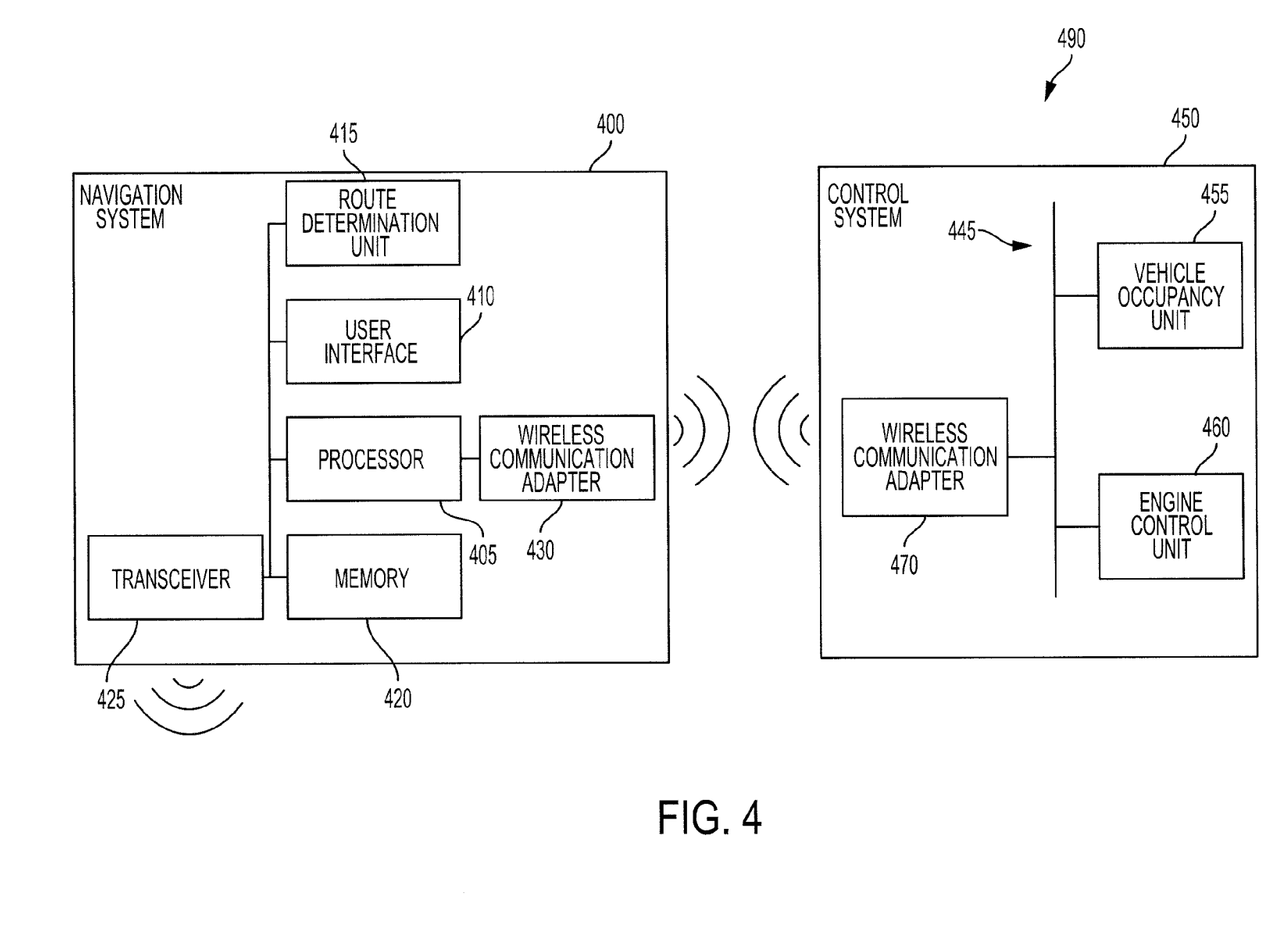
FIG. 4 depicts a block diagram of a navigation system in communication with a vehicle, according to an embodiment of the invention.

Turning to FIG. 4, a navigation system 400 as depicted may be connected to a control system 450 of a vehicle 490. In one example, the control system 450 of the vehicle 490 includes a CAN bus 445. In this embodiment, the navigation system 400 may be a portable, third-party navigation system usable by the user inside or outside the vehicle 490. When utilized to provide turn-by-turn directions for the vehicle 490, the navigation system 400 may be, in one example, attached to the dash board, the inside of the windshield of the vehicle 490, or attached to an air ventilation port.

The navigation system 400 may include a processor 405, a user interface 410, a route-determination unit 415, a memory 420 and a transceiver 425. The navigation system 400 may further include a wireless communication adapter 430 for connecting the navigation system 400 to a wireless communication adapter 470 of a vehicle control system 450. The adapters 430 and 470 may communicate using a standardized wireless communications protocol, such as Bluetooth, and may be coupled to each other wirelessly as long as both devices are within communication range. In some embodiments, the navigation system 400 may be considered by the vehicle control system 450 as an ECU when connected to the CAN bus 445 wirelessly via wireless communication adapter 470, and may communicate with other ECUs via the CAN bus 445. While Bluetooth is described in this particular example, any known wireless communications protocol may be used.

The processor 405, the user interface 410, the route calculation unit 415, the memory 420 and the transceiver 425 of the navigation system 400 may operate in a similar fashion as those of the navigation system 300. Similarly, the CAN bus 445, the vehicle occupancy unit 455 and the engine control unit 460 may operate generally like those in FIG. 3.

In an alternate embodiment, the wireless communication adapter 470 is unable to communicate wirelessly and is only capable of wired communication of data. In this embodiment, an external wireless communication adapter may be used to enable the communication adapter 470 to communicate wirelessly with wireless communication adapter 430.

In yet another alternate embodiment, the navigation system 400 and the control system 450 may be connected by a wired connection, instead of a wireless connection, as shown in FIG. 4. In some embodiments, the wired connection is a USB cable. In some embodiments, the wired connection is an Ethernet cable.

Figure 5:
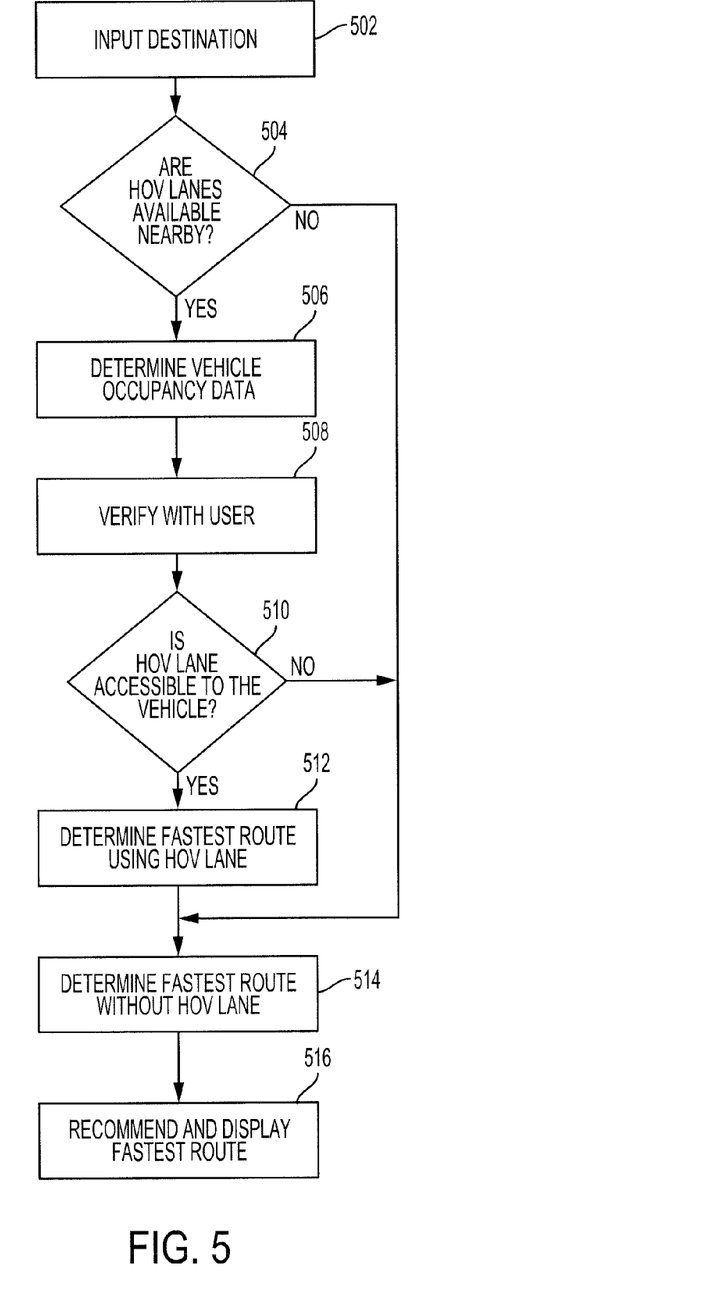
FIG. 5 illustrates an example of a flowchart describing an operation of a navigation system, according to an embodiment of the invention.

FIG. 5 illustrates a flowchart of a method for determining a suggested route based on vehicle occupancy data, according to an embodiment of the invention. The method may be performed by any of the navigation systems described herein.

A destination is input into a navigation system of the vehicle (step 502). In some embodiments, the destination is communicated to the navigation system via a user interface. In some embodiments, when the destination is input into the navigation system, the navigation system determines the current location of the vehicle. A transceiver communicating with a GPS satellite may be used to determine the current location of the vehicle. In an example embodiment, the current location of the vehicle is Glendora, Calif. and the destination of the vehicle is Monrovia, Calif.

Whether the HOV lanes are available nearby is determined (step 504). In some embodiments, a processor of the navigation system compares the current location of the vehicle against map data and determines whether any HOV lanes are within a predetermined range of the current location of the vehicle. In the example embodiment, the HOV lanes of the 210 freeway are within a range of the current location of the vehicle. In some embodiments, the HOV lane data is stored with the map data in the memory. In some embodiments, the HOV lane data is stored in an HOV lane table and obtained using the transceiver, from another device or server. When no HOV lanes are available within the range of the vehicle, a fastest route to the destination from the current location is determined without use of HOV lanes (step 514).

When HOV lanes are available within the range of the vehicle, vehicle occupancy data is determined (step 506). In some embodiments, the vehicle occupancy data is determined by a vehicle occupancy unit, as described herein. The vehicle occupancy data is presented to the user for verification (step 508). In some embodiments, the vehicle occupancy data is presented via a navigation display 102 as shown in FIG. 1. In the example embodiment, the vehicle occupancy unit detects three occupants, which is confirmed by the user.

Whether the HOV lane is accessible to the vehicle is determined (step 510). In some embodiments, it is determined that the HOV lane is accessible to the vehicle when the user has provided an indication via the user interface of the navigation system that the vehicle has access to the HOV lanes. In some embodiments, it is determined that the HOV lane is accessible to the vehicle when the current occupancy of the vehicle matches or exceeds the HOV lane criteria of HOV lanes ahead.

Figure 8:
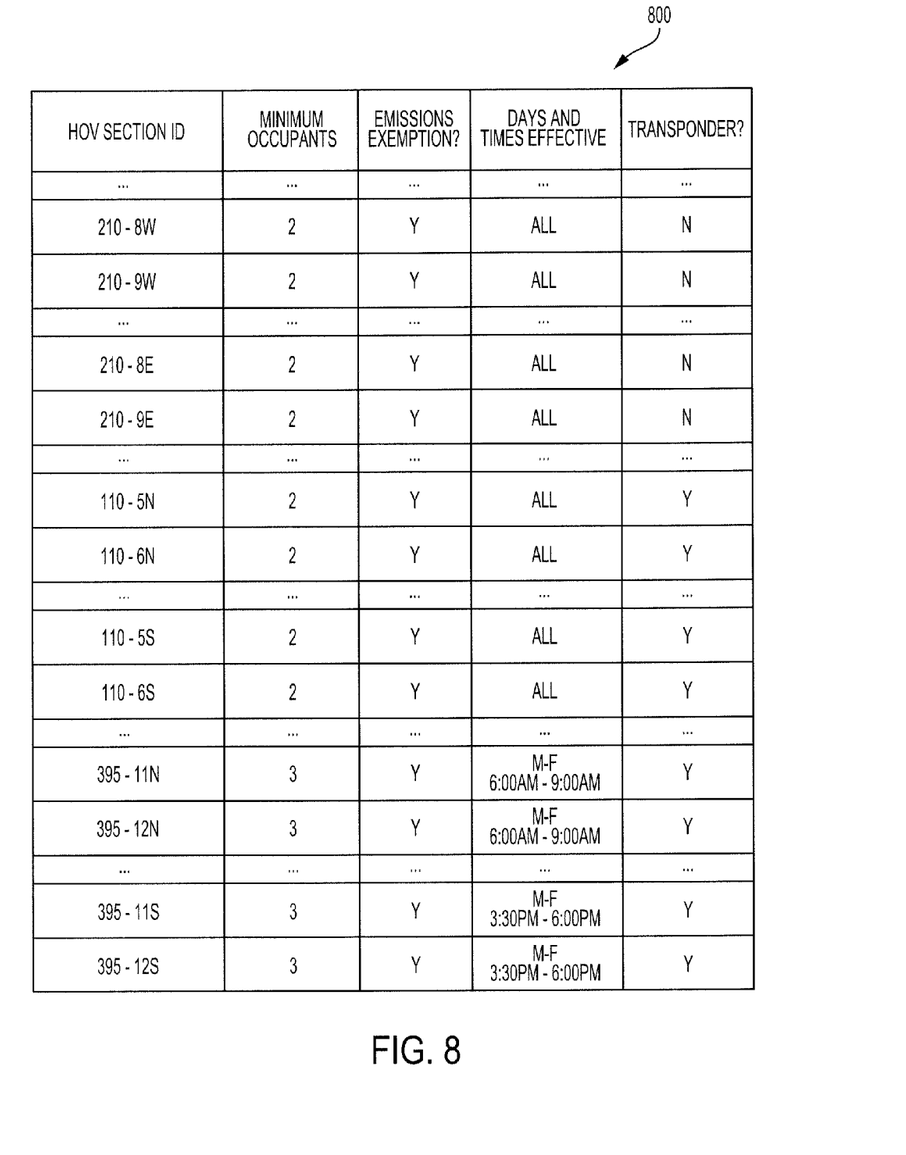
FIG. 8 illustrates an HOV lane table storing HOV lane data for a navigation system, according to an embodiment of the invention.

In some embodiments, the HOV lane criteria are stored in a table, indexed by an identifier unique to a particular freeway section (as shown in FIG. 8). For example, the 210 freeway may be divided into 200 different sections, and each section may be assigned a unique identifier, such as 210-62 W or 210-118 E. In some embodiments, when the determination of whether HOV lanes are nearby is made (in step 504), freeway section identifiers of freeway sections within a range (e.g., 1 mile or 2 miles) of the current location of the vehicle are also determined. The occupancy of the vehicle is compared to those of freeway sections within the range of the current location of the vehicle. In the example embodiment, the sections of the 210 freeway within the range of the current location of the vehicle are referenced and the occupancy criteria for those sections are compared to the occupancy of the vehicle. In the example embodiment, the sections of the 210 freeway within the range of the current location of the vehicle have a two occupant minimum.

The HOV lane criteria may also include time-based criteria. That is, some HOV lanes have a first criteria at a first date or time range, and a second criteria at a second date or time range. For example, some HOV lanes are available of use by all vehicles on holidays or weekends or during particular hours, such as off-peak commuting hours.

When the HOV lane is accessible to the vehicle, a fastest route to the destination from the current location of the vehicle using HOV lanes is determined (step 512). In some embodiments, the processor of the navigation system determines multiple potential routes using the HOV lane sections within the range of the current location of the vehicle. The processor determines the fastest route from the potential routes based on traffic data received via the transceiver. In the example embodiment, the fastest route is to take the 210 West using the HOV lane for a first section of the route until Exit 41, take a non-HOV lane for a second section of the route between Exit 41 and Exit 39, and finally to take the HOV lane for a third section of the route, from Exit 39 until the destination. In the example embodiment, the fastest route from Glendora, Calif. to Monrovia, Calif. takes 16 minutes.

As shown in the example embodiment, a particular HOV lane route may specify which sections of the HOV lane to use. For example, a portion of the freeway may have three HOV lane entrance/exit points. The route may specify to the driver to enter at the first entrance/exit point, exit at the second entrance/exit point, and re-enter at the third entrance/exit point. The route may suggest use of a non-HOV lane between the second and third entrance/exit point because traffic may be heavier in the HOV lane for that section of the freeway than for the non-HOV lane, due to an accident or congestion. However, once that section of the HOV lane is passed, the route may suggest using the HOV lane again, as the HOV lane may be faster than the non-HOV lane after the momentary congestion. The system may use traffic logic to account for presumed traffic upon the vehicle's arrival at any point along the route, in order to accurately gauge a benefit of the route, or to evaluate a benefit associated with a modification to the existing route. In some embodiments, the processor of the system determines the presumed or predicted traffic based on current traffic data and historical traffic data stored in the memory of the system.

A fastest route without using HOV lanes is also determined (step 514). In the example embodiment, the 210 West is still the fastest route, but the time taken in the non-HOV lanes is 26 minutes. The route using HOV lanes is compared to the route using non-HOV lanes based on traffic data and the fastest route is recommended and displayed (step 516). When the route using HOV lanes is faster than the route using non-HOV lanes, the route using HOV lanes is recommended. When the route using non-HOV lanes is faster than the route using HOV lanes, the route using non-HOV lanes is recommended. In some embodiments, while one particular route may be recommended as the fastest route, a predetermined number of fastest routes may be presented on the navigation system display, for the user's consideration, as shown in FIG. 2.

When no HOV lanes are nearby, the fastest route using non-HOV lanes is determined and recommended. For example, if the vehicle is in Lake Arrowhead, Calif. where there are no HOV lanes nearby, only routes using non-HOV lanes are determined.

The occupancy based navigation system may update the available routes based on an updated occupancy of the vehicle. For example, a vehicle may begin a trip with four total occupants and the vehicle is able to use an HOV lane. A route using an HOV lane is determined and followed by the driver. At some point in the trip, three of the occupants may exit the vehicle, leaving only the driver. The vehicle is now no longer qualified to use the HOV lane. The vehicle occupancy unit may detect a change in the number of total occupants using one or more seat belt sensors, weight sensors, suspension sensors, thermal sensors, or imaging sensors. An updated route is generated based on the change, as the vehicle no longer is eligible to use the HOV lane. In some embodiments, the current route selected is modified to exclude use of the HOV lane. In some embodiments, all possible routes are analyzed and a fastest route is presented to the user.

Figure 6:
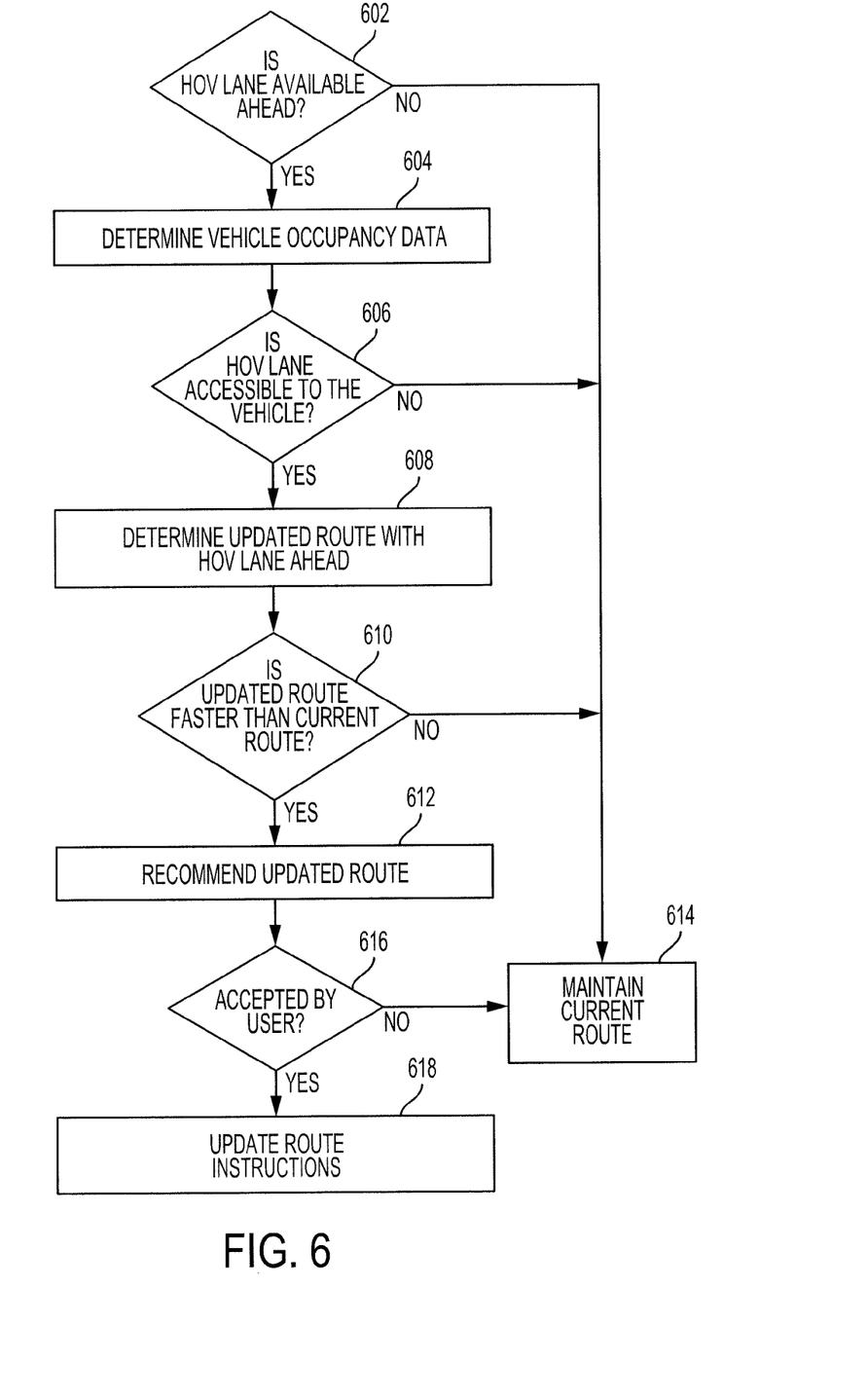
FIG. 6 illustrates an example of a flowchart describing an operation of a navigation system, according to an embodiment of the invention.

FIG. 6 illustrates a flowchart of a method for dynamically providing a suggested route based on vehicle occupancy data, according to an embodiment of the invention. In some situations, while a vehicle is currently being navigated toward a destination, a faster route than the one currently being taken may be determined, as traffic has changed in HOV lanes and non-HOV lanes.

While a vehicle is being navigated to a destination using a current route, whether an HOV lane is available ahead is determined (step 602). In some embodiments, whether an HOV lane is available ahead refers to whether an HOV lane section is available in an upcoming portion of the original route. In some embodiments, whether an HOV lane is available ahead refers to whether an HOV lane section is available within a range of the current location of the vehicle or within a range of an anticipated location of the vehicle while taking the current route. In some embodiments, whether an HOV lane is available refers to whether at least one section of a freeway ahead has an HOV lane. In some embodiments, a processor of the navigation system determines whether at least one section of a freeway ahead has an HOV lane based on map data and a current location of the vehicle. In some embodiments, upon determining availability of HOV lanes ahead, the system determines whether those HOV lanes are being used in the current route. If so, the process ends.

When it is determined that an HOV lane is available ahead and not in the current route, the system determines the current vehicle occupancy (step 604). In some embodiments, the system determines the current vehicle occupancy using a vehicle occupancy unit, as described herein. In some embodiments, a vehicle occupancy may have been previously determined, and the vehicle occupancy data for the navigation session may be stored in a memory. In those situations, the system determines the current vehicle occupancy based on the stored vehicle occupancy data. In some embodiments, when a change is determined between the stored vehicle occupancy data and the current vehicle occupancy data from the vehicle occupancy unit, the system provides a prompt to the user to verify the correct number of occupants in the vehicle. A change may occur when the vehicle is stopped, parked or shut off.

Whether the HOV lane ahead is accessible to the vehicle is determined, as described herein (step 606). When the HOV lane ahead is accessible to the vehicle, an updated route using the HOV lane ahead is determined (step 608). In some embodiments, the route determination unit of the navigation system determines the updated route, as described herein.

The updated route is compared to the current route (step 610). When the current route is faster than the updated route, the current route is maintained and the process ends (step 614). When the updated route is faster than the current route, the updated route is recommended (step 612). In some embodiments, a prompt is provided on a display screen alerting the user of the updated route.

It is determined by the ECU, for example, whether the user accepts the updated route (step 616). In some embodiments, the user accepts the updated route by interacting with an icon appearing on the user interface, as described herein. When the user accepts the updated route, the route instructions are updated (step 618). When the user does not accept the updated route, the current route is maintained and the process ends (step 614).

In an example embodiment, the user is currently on the 55 South heading toward Garden Grove, Calif. The current route includes use of the 55 South non-HOV lanes and 22 West non-HOV lanes, as there was no traffic when the current route was determined and there was no difference in travel time between the HOV lanes and the non-HOV lanes.

The system determines whether there are HOV lanes ahead on the 55 South and the 22 West (step 602). Since there are HOV lane sections in both the 55 South and the 22 West, the current vehicle occupancy is determined (step 604). The stored vehicle occupancy data indicates three occupants and current vehicle occupancy data using the vehicle occupancy unit indicates three occupants. The current vehicle occupancy of three occupants is compared against HOV lane data associated with the HOV lane sections identified of the 55 South and the 22 West (step 606). All the segments identified in the 55 South and the 22 West allow for use of the HOV lanes with two or more occupants, so the HOV lanes ahead are accessible to the vehicle. A fastest route using one or more of the HOV lane sections of the 55 South and the 22 West is determined based on traffic data (step 608) and compared to the current route (step 610). Traffic patterns have changed, and the updated route is now faster than the current route by 12 minutes. As the updated route is faster, it is recommended (step 612) and the user accepts via a user interface on the navigation system (step 616). Accordingly, the route instructions are updated (step 618).

Figure 7:
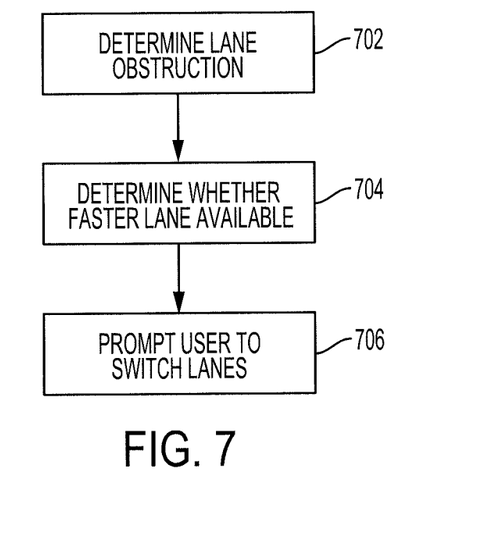
FIG. 7 illustrates an example of a flowchart describing an operation of a navigation system, according to an embodiment of the invention.

FIG. 7 illustrates a flowchart of a method for dynamically updating a route based on lane traffic data, according to an embodiment of the invention. In some situations, when a vehicle is in a traffic lane (freeway HOV lane, freeway non-HOV lane, or surface street lane), traffic congestion may form from a temporary obstruction of a lane ahead. Lanes may be closed or otherwise obstructed due to an accident, construction, a fallen tree, a crime scene, or any other number of reasons. The system may dynamically update a route based on lane traffic data to instruct the user to move to a different lane if the lane the user is currently in is obstructed ahead.

Whether a lane obstruction is ahead is determined (step 702). In some embodiments, the determination of whether a lane obstruction is ahead is triggered when the vehicle is travelling at a speed significantly lower than the average speed for the particular road. In some embodiments, lane obstruction data is determined by a third party using fixed cameras or other sensors to detect an obstructed lane. In some such embodiments, the lane obstruction data is received by the navigation system via a transceiver. For example, video data from fixed cameras located on roads may be analyzed by a third party to determine that the rightmost lane of a road is obstructed due to construction work. The lane obstruction data is communicated by the third party to the navigation system of the vehicle using the transceiver.

In some embodiments, the lane obstruction data is communicated by a third party associated with a city or a utility company. The lane obstruction data may be associated with a planned construction or outage, for example, and may include an identification of which lanes are obstructed during a period of time. The lane obstruction data may be received by the navigation system via a transceiver, and may be received when the vehicle is at a predetermined vicinity of the lane obstruction or may be communicated in advance in order for the navigation system to include the lane obstruction in route determinations and/or obstruction avoidance determinations. For example, the navigation system of a vehicle may receive, via the transceiver, lane obstruction data associated with a planned city construction while the vehicle is within range of a home Wi-Fi connection. The lane obstruction associated with the lane obstruction data may be in a routine morning commute route of the vehicle, and the navigation system may accordingly account for the lane obstruction when determining a route for the vehicle.

In some embodiments, the lane obstruction data is determined using vehicle-to-vehicle communications. In an example embodiment, a processor of a navigation system of a first vehicle may detect a construction area based on image data detected by a camera of the first vehicle. The first vehicle may also detect the driver maneuvering the vehicle away from a current lane. Based on the detected construction area and the maneuvering, the processor determines a lane obstruction ahead. The first vehicle may then communicate, to a second vehicle behind the first vehicle, lane obstruction data identifying the obstructed lane. The second vehicle may pass the lane obstruction data to a third vehicle behind the second vehicle, using vehicle-to-vehicle communications, and the process may continue to subsequent rear vehicles.

Whether a faster lane is available is determined (step 704). In some embodiments, the lane obstruction data includes an identification of the obstructed lane, and if the vehicle is currently in the obstructed lane, a faster lane is automatically determined to be available. In some embodiments, in response to receiving an indication that a lane obstruction is present, the navigation system retrieves lane-by-lane traffic data for roads in and around the current location of the vehicle. The lane-by-lane traffic data is compared to the lane the vehicle is currently in to determine whether a faster lane is available.

When a faster lane is available, the navigation system provides a prompt to the user that a lane obstruction is ahead, and that the vehicle should switch from the current lane to a different lane (step 706). In some embodiments, the obstructed lane is an HOV lane. When the obstructed lane is an HOV lane and the HOV lane is a part of a route currently taken by the vehicle, an updated route is determined including use of non-HOV lanes to avoid the obstructed HOV lane. In some embodiments, when the vehicle is an autonomous or semi-autonomous vehicle, the navigation system automatically switches from the current obstructed lane to a different lane.

FIG. 8 is a table showing exemplary values for HOV lane data stored in the HOV lane table 800 according to an embodiment of the invention. The HOV lane table 800 includes exemplary values associated with each section of an HOV lane.

Each HOV lane section is associated with an HOV section ID. In some embodiments, the HOV section ID is a unique identifier made of a series of letters, numbers, or symbols. In the exemplary values of HOV lane table 800, the HOV section ID includes the freeway number followed by a dash, a section identifier, and a direction. For example, 210-8 W indicates that the particular HOV section is on the 210 freeway, is the eighth section of the HOV lane, and is westbound.

Each HOV lane section is also associated with a minimum number of occupants. In some embodiments, a single HOV lane section (with a single HOV section ID) may have two entries when a first minimum number of occupants is required during a first time period and a second minimum number of occupants is required during a second time period. For example, a freeway may allow for two or more occupants to use a particular HOV lane section during weekends and weekdays between 9:00 PM to 4:00 AM, but requires three or more occupants at all other times.

Each HOV lane section is also associated with an emissions exemption status. The emissions exemption status indicates whether vehicles meeting certain legislatively determined emissions criteria have access to the HOV lane section. As described herein, whether the vehicle meets this status may be determined by the user and an indication may be entered into the navigation system via a user interface.

Each HOV lane section is also associated with days and times the HOV lane section is effective. As shown in the HOV lane table 800, the 11th and 12th sections of the 395 North require three or more occupants during 6:00 AM to 9:00 AM on Monday to Friday. Those particular HOV lane sections of the 395 North may be closed during the remaining days and times or may have a different set of criteria for use.

Each HOV lane section is also associated with whether a transponder is needed to use the HOV lane. Certain freeways incorporate use of a transponder affixed to the vehicle and registered to an operator of the vehicle, for billing and tracking purposes. In some embodiments, a distinction may be made between an absolute use or a preferred use of a transponder. For example, an absolute use may require use of the transponder in order to use the HOV lane, or else a punitive fee is issued to an individual to whom the vehicle is registered. A preferred use may facilitate automatic billing of an account associated with the operator of the vehicle, and in the absence of a transponder in the preferred use situations, the individual to whom the vehicle is registered is invoiced, but no punitive fee is issued.

As described herein, the HOV lane table 800 may be stored locally in a memory of the navigation system or in a cloud accessible by the navigation system. In some embodiments, the HOV lane table is updated periodically via the transceiver of the navigation system. In some embodiments, the HOV lane table 800 is updated by a service center when the vehicle is brought in for maintenance. In some embodiments, the HOV lane table 800 is stored remotely and HOV lane data corresponding to the HOV lane sections of interest are retrieved by the navigation system via a transceiver when accessing traffic data. In some embodiments, when the navigation system does not have access to the HOV lane table 800, HOV lanes are not considered when providing routes to the user.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that the scope shall not be restricted, except in light of the appended claims and their equivalents.

What is claimed is:

1. A system for navigating a vehicle to a destination using a High Occupancy Vehicle (HOV) lane, the system comprising:
    a vehicle occupancy unit configured to determine vehicle occupancy data;
    a transceiver configured to receive location data and traffic data;
    a memory configured to store map data and HOV lane data indicating HOV lane access criteria;
    a display configured to display a route; and
    a processor connected to the vehicle occupancy unit, the transceiver, the display, and the memory, the processor configured to:
        determine a current location of the vehicle based on the location data,
        determine, at a first time, a plurality of HOV lane sections within proximity of the current location of the vehicle based on the map data,
        determine whether the plurality of HOV lane sections are accessible to the vehicle based on the vehicle occupancy data and the HOV lane data,
        when the plurality of HOV lane sections are accessible to the vehicle, determine, based on the traffic data, a fastest HOV lane route between the current location and the destination, the fastest HOV lane route including use of an HOV lane section from the plurality of HOV lane sections,
        communicate an instruction to the display to display the fastest HOV lane route,
        determine an updated current location of the vehicle based on the location data,
        determine, at a second time after the first time, a plurality of non-HOV lane sections within proximity of the updated current location of the vehicle along the fastest HOV lane route, each non-HOV lane section in the plurality of non-HOV lane sections having a corresponding counterpart HOV lane section,
        determine a non-HOV lane route between the updated current location of the vehicle and the destination, the non-HOV lane route including use of a non-HOV lane section from the plurality of non-HOV lane sections,
        determine whether the non-HOV lane route is faster than the fastest HOV lane route between the updated current location of the vehicle and the destination, and
        communicate an instruction to the display to display the non-HOV lane route when the non-HOV lane route is faster than the fastest HOV lane route.

2. The system of claim 1, wherein the vehicle occupancy unit is further configured to detect a change in the vehicle occupancy data, and wherein the processor is further configured to determine an updated route between the current location of the vehicle and the destination when a change in vehicle occupancy data is detected.

3. The system of claim 1, wherein the processor is further configured to:
    determine an HOV lane section ahead of the vehicle;
    determine whether the HOV lane section ahead of the vehicle is included in the current route;
    when the HOV lane section ahead of the vehicle is not included in the current route, determine whether the HOV lane section ahead of the vehicle is accessible to the vehicle based on the vehicle occupancy data and the HOV lane data;
    when the HOV lane section ahead of the vehicle is accessible to the vehicle, determine an updated route between the current location of the vehicle and the destination, the updated route including the HOV lane section ahead of the vehicle; and
    determine whether the updated route is faster than the current route, and
    wherein the display is further configured to display the updated route when the updated route is faster than the current route.

4. The system of claim 3, wherein the HOV lane section ahead of the vehicle is located within a range of an anticipated location of the vehicle, based on the current route.

5. The system of claim 3, wherein the processor is further configured to determine whether the updated route is faster than the current route based on the traffic data.

6. The system of claim 1, wherein the map data comprises a plurality of HOV lane sections and a plurality of non-HOV lane sections, wherein each HOV lane section is associated with a corresponding non-HOV lane section.

7. The system of claim 1, wherein the HOV lane data includes occupancy criteria and time criteria.

8. The system of claim 1, wherein the vehicle occupancy unit comprises at least one of a seat belt engagement sensor, a weight sensor, a suspension sensor, a thermal sensor, or an imaging sensor.

9. A vehicle comprising:
    a memory configured to store map data including a plurality of HOV lane sections and a plurality of non-HOV lane sections;
    a transceiver configured to receive location data associated with the vehicle, and traffic data associated with each of the HOV lane sections and the non-HOV lane sections;
    a user interface configured to receive an indication that the vehicle has access to HOV lanes;
    a display configured to display a route; and
    a processor connected to the transceiver, the user interface, the display, and the memory, the processor configured to:
        determine a current location of the vehicle based on the location data,
        determine, at a first time, a plurality of HOV lane sections within proximity of the current location of the vehicle based on the map data,
        determine a fastest HOV lane route based on the traffic data, the fastest HOV lane route including an HOV lane section from the plurality of HOV lane sections,
        determine an updated current location of the vehicle based on the location data,
        determine, at a second time after the first time, a plurality of non-HOV lane sections within proximity of the updated current location of the vehicle along the fastest HOV lane route, each non-HOV lane section in the plurality of non-HOV lane sections having a corresponding counterpart HOV lane section, determine a non-HOV lane route between the updated current location of the vehicle and the destination, the non-HOV lane route including use of a non-HOV lane section from the plurality of non-HOV lane sections, determine whether the non-HOV lane route is faster than the fastest HOV lane route between the updated current location of the vehicle and the destination and the traffic data, and communicate an instruction to the display to display the non-HOV lane route when the non-HOV lane route is faster than the HOV lane route.

10. The vehicle of claim 9, wherein the vehicle has access to HOV lanes via a qualifying number of occupants in the vehicle.

11. The vehicle of claim 9, wherein the vehicle has access to HOV lanes via a vehicle emissions based criteria.

12. The vehicle of claim 9,
wherein the processor is further configured to:
determine an HOV lane section ahead of the vehicle;
determine whether the HOV lane section ahead of the vehicle is a part of a current route;
when the HOV lane section ahead of the vehicle is not a part of the current route, determine an updated route between the current location of the vehicle and the destination, the updated route including the HOV lane section ahead of the vehicle; and
determine whether the updated route is faster than the current route based on traffic data, and
wherein the display is further configured to display the updated route when the updated route is faster than the current route.

13. The system of claim 12, wherein the HOV lane section ahead of the vehicle is located within a range of an anticipated location of the vehicle, based on the current route.

14. A method for navigating a vehicle to a destination using a High Occupancy Vehicle (HOV) lane, the method comprising:
determining, by a vehicle occupancy unit, vehicle occupancy data;
receiving, by a transceiver, location data associated with the vehicle, and traffic data;
storing, by a memory, map data and HOV lane data indicating HOV lane access criteria;
determining, by a processor, a current location of the vehicle based on the location data;
determining, by the processor at a first time, a plurality of HOV lane sections within proximity of the current location of the vehicle based on the map data;
determining, by the processor, whether the plurality of HOV lane sections are accessible to the vehicle based on the vehicle occupancy data and the HOV lane data;
when the plurality of HOV lane sections are accessible to the vehicle, determining, by the processor based on the traffic data, a fastest HOV lane route between the current location and a destination, the HOV lane route including an HOV lane section from the plurality of HOV lane sections;
displaying, by a display, the fastest HOV lane route;

determining, by the processor, an updated current location of the vehicle based on the location data;

determining, by the processor, at a second time after the first time, a plurality of non-HOV lane sections within proximity of the updated current location of the vehicle along the fastest HOV lane route, each non-HOV lane section in the plurality of non-HOV lane sections having a corresponding counterpart HOV lane section;

determining, by the processor, a non-HOV lane route between the updated current location of the vehicle and the destination, the non-HOV lane route including use of a non-HOV lane section from the plurality of non-HOV lane sections;

determining, by the processor, whether the non-HOV lane route is faster than the fastest HOV lane route between the updated current location of the vehicle and the destination; and displaying, by the display, the non-HOV lane route when the non-HOV lane route is faster than the fastest HOV lane route.

15. The method of claim 14, further comprising:
detecting, by the vehicle occupancy unit, a change in the vehicle occupancy data; and
determining, by the processor, an updated route between the current location of the vehicle and the destination when a change in vehicle occupancy data is detected.

16. The method of claim 14, further comprising:
determining, by the processor, an HOV lane section ahead of the vehicle;
determining, by the processor, whether the HOV lane section ahead of the vehicle is included in a current route;
when the HOV lane section ahead of the vehicle is not included in the current route, determining, by the processor, whether the HOV lane section ahead of the vehicle is accessible to the vehicle based on the vehicle occupancy data and the HOV lane data;
when the HOV lane section ahead of the vehicle is accessible to the vehicle, determining, by the processor, an updated route between the current location of the vehicle and the destination, the updated route including the HOV lane section ahead of the vehicle; and
determining, by the processor, whether the updated route is faster than the current route, and
displaying, by the display, the updated route when the updated route is faster than the current route.

17. The method of claim 16, wherein the HOV lane section ahead of the vehicle is located within a range of an anticipated location of the vehicle, based on the current route.

18. The method of claim 16, further comprising
determining, by the processor, whether the updated route is faster than the current route based on the traffic data.

19. The method of claim 16, wherein the map data comprises a plurality of HOV lane sections and a plurality of non-HOV lane sections, wherein each HOV lane section is associated with a corresponding non-HOV lane section.

20. The method of claim 16, wherein the HOV lane data includes occupancy criteria and time criteria.

* * * * *